US011043742B2

(12) United States Patent
Ghassemzadeh et al.

(10) Patent No.: US 11,043,742 B2
(45) Date of Patent: Jun. 22, 2021

(54) PHASED ARRAY MOBILE CHANNEL SOUNDING SYSTEM

(71) Applicant: AT&T Intellectual Property I, L.P., Atlanta, GA (US)

(72) Inventors: Saeed Ghassemzadeh, Austin, TX (US); Aditya Chopra, Austin, TX (US); Arunabha Ghosh, Austin, TX (US); Andrew Thornburg, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 142 days.

(21) Appl. No.: 16/527,218

(22) Filed: Jul. 31, 2019

(65) Prior Publication Data
US 2021/0036421 A1 Feb. 4, 2021

(51) Int. Cl.
*H01Q 3/34* (2006.01)
*H04L 5/00* (2006.01)
(Continued)

(52) U.S. Cl.
CPC ............ *H01Q 3/34* (2013.01); *H01Q 3/2617* (2013.01); *H01Q 21/065* (2013.01);
(Continued)

(58) Field of Classification Search
CPC ...... H01Q 3/34; H01Q 21/065; H01Q 3/2617; H04L 5/0048; H04L 5/001; H04L 5/0091;
(Continued)

(56) References Cited

U.S. PATENT DOCUMENTS 8,160,008 B2  4/2012  McCoy
8,351,411 B2  1/2013  Kim et al.
(Continued)

FOREIGN PATENT DOCUMENTS

WO    2017086922 A1    5/2017

OTHER PUBLICATIONS

Agarwal et al., "Simulation and Analysis of 5G Mobile Phones Antenna", International Journal of Electronics and Communication Engineering and Technology (IJECET) vol. 7 Issue 5 (2016). pp. 7-12.
(Continued)

*Primary Examiner* — Renan Luque

(57) ABSTRACT

A wireless channel sounding system may include a wireless channel sounding transmitter having at least two radio frequency front ends coupled to at least two phased array antennas to generate at least two radio frequency channel sounding waveforms from at least two baseband signals, the at least two phased array antennas each controllable to provide a respective transmit beam that is steerable in azimuth and elevation, and that comprises one of the at least two radio frequency channel sounding waveforms, where faces of the at least two phased array antennas are arranged to provide a transmit beam coverage over 360 degrees in azimuth, and a first processing system including at least one processor, in communication with the at least two radio frequency front ends, to provide the at least two baseband signals and steer the respective transmit beams via instructions to the at least two radio frequency front ends.

20 Claims, 5 Drawing Sheets

(51) Int. Cl.
*H01Q 21/06* (2006.01)
*H04B 7/06* (2006.01)
*H01Q 3/26* (2006.01)

(52) U.S. Cl.
CPC ......... *H04B 7/0617* (2013.01); *H04B 7/0634* (2013.01); *H04L 5/0048* (2013.01)

(58) Field of Classification Search
CPC .. H04B 7/0634; H04B 7/0617; H04B 7/0452; H04B 7/1555; H04W 72/042; H04W 92/045; H04W 92/10
See application file for complete search history.

(56) References Cited

U.S. PATENT DOCUMENTS

| | | | |
|---|---|---|---|
| 8,837,394 | B2 | 9/2014 | Lin |
| 9,300,371 | B1* | 3/2016 | Zhang ................ H04L 27/0008 |
| 9,331,767 | B1* | 5/2016 | Thomas ............... H04B 7/0421 |
| 9,621,248 | B2 | 4/2017 | Maltsev |
| 9,648,547 | B1 | 5/2017 | Hart |
| 9,768,501 | B2 | 9/2017 | Maltsev |
| 10,091,662 | B1 | 10/2018 | Bendlin |
| 10,244,408 | B1 | 3/2019 | Vannucci et al. |
| 2013/0286960 | A1 | 10/2013 | Li et al. |
| 2014/0016573 | A1 | 1/2014 | Nuggehalli et al. |
| 2014/0249827 | A1 | 2/2014 | Sen |
| 2014/0177607 | A1 | 6/2014 | Li et al. |
| 2014/0301492 | A1 | 10/2014 | Xin et al. |
| 2015/0163036 | A1 | 6/2015 | Thomas et al. |
| 2016/0065286 | A1 | 3/2016 | Kim et al. |
| 2016/0164708 | A1 | 6/2016 | Dahlman et al. |
| 2016/0295610 | A1 | 10/2016 | Grandhi et al. |
| 2017/0117950 | A1* | 4/2017 | Strong ................ H04B 7/0682 |
| 2017/0141900 | A1 | 5/2017 | McCoy |
| 2017/0207545 | A1 | 7/2017 | Miraftab et al. |
| 2017/0207547 | A1 | 7/2017 | Zhai et al. |
| 2017/0237180 | A1 | 8/2017 | Corman et al. |
| 2017/0310439 | A1 | 10/2017 | Yang et al. |
| 2017/0324459 | A1 | 11/2017 | Koskela et al. |
| 2017/0353338 | A1 | 12/2017 | Amadjikpe et al. |
| 2018/0049150 | A1 | 2/2018 | Chandwani et al. |
| 2018/0103468 | A1 | 4/2018 | Li et al. |
| 2018/0131440 | A1 | 5/2018 | Patel et al. |
| 2018/0227775 | A1 | 8/2018 | Bisiules et al. |
| 2018/0288557 | A1 | 10/2018 | Najaf-Zadeh et al. |
| 2018/0302201 | A1 | 10/2018 | Yoo et al. |
| 2018/0376505 | A1 | 12/2018 | Zhang et al. |
| 2019/0028159 | A1 | 1/2019 | Bisiules et al. |
| 2019/0089419 | A1 | 3/2019 | Kim et al. |
| 2019/0116506 | A1 | 4/2019 | Bendlin et al. |

OTHER PUBLICATIONS

C. U. Bas, et al. "A Real-Time Millimeter-Wave Phased Array MIMO Channel Sounder," CoRR, abs/1703.05271, 2017, http://arxiv.org/abs/1703.05271.

C. Umit Bas, et al. "Real-Time Millimeter-Wave MIMO Channel Sounder for Dynamic Directional Measurements," 2018, 1807.11921,arXiv, eess.SP.

* cited by examiner

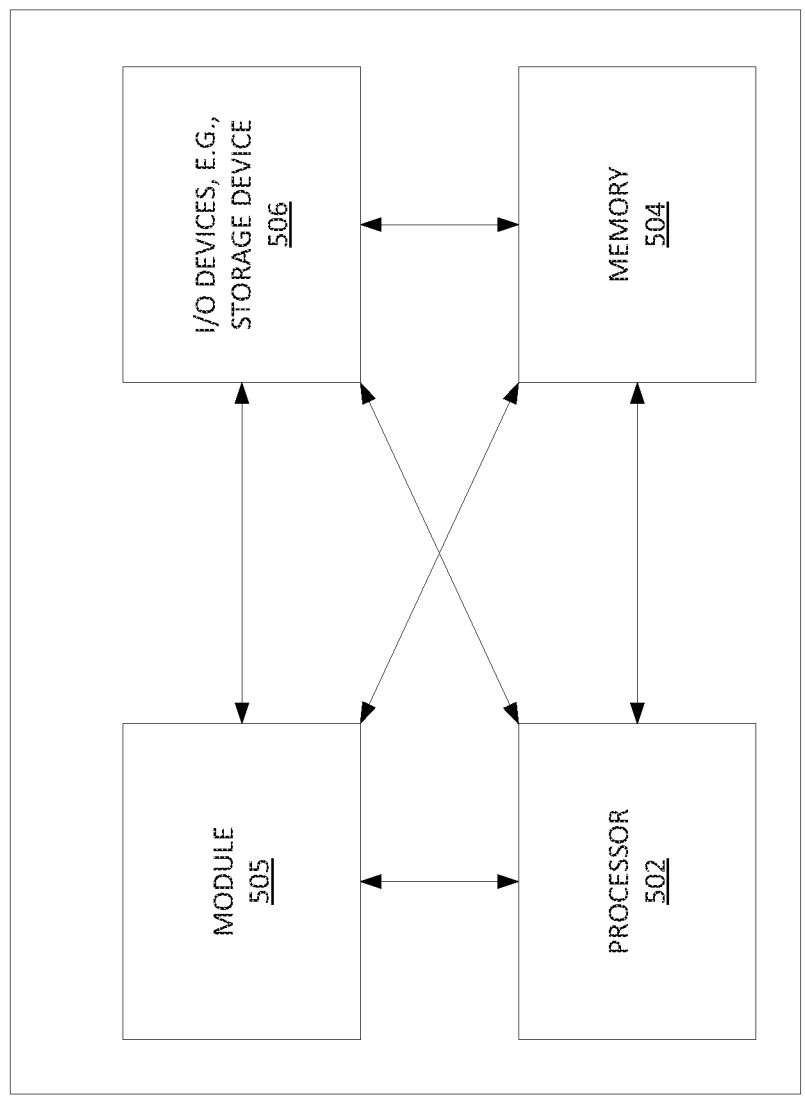

PHASED ARRAY MOBILE CHANNEL SOUNDING SYSTEM

The present disclosure relates generally to wireless communication networks, and more particularly to wireless channel sounding systems, non-transitory computer readable media, and methods for measuring wireless channel parameters using a phased array channel sounding transmitter.

BACKGROUND

Wireless channel sounding may comprise measuring wireless channel related parameters such as complex impulse response, path loss, received signal strength (RSS), excess delay, or root-mean-square (RMS) delay spread, Doppler spread, fade rate, angle of arrival (AoA) and/or angle of departure (AoD), and the like, as experienced by a user equipment or base station. In one implementation, channel sounding may utilize directional antennas. For instance, to measure AoA using a directional antenna, the antenna may be turned in incremental steps to measure the RSS. The AoA is recorded where the RSS is at a maximum. While this solution is inexpensive, it is a relatively slow measurement technique.

SUMMARY

In one example, the present disclosure discloses a wireless channel sounding system, non-transitory computer readable medium, and method for measuring wireless channel parameters using a phased array channel sounding transmitter. For example, a wireless channel sounding system may include a wireless channel sounding transmitter having at least two radio frequency front ends coupled to at least two phased array antennas to generate at least two radio frequency channel sounding waveforms from at least two baseband signals. The wireless channel sounding transmitter may further include the at least two phased array antennas, each of the at least two phased array antennas controllable to provide a respective transmit beam that is steerable in azimuth and elevation, and that comprises one of the at least two radio frequency channel sounding waveforms, where faces of the at least two phased array antennas are arranged to provide a transmit beam coverage over 360 degrees in azimuth. The wireless channel sounding transmitter may also include a first processing system including at least one processor, in communication with the at least two radio frequency front ends, to provide the at least two baseband signals and steer the respective transmit beams via instructions to the at least two radio frequency front ends.

BRIEF DESCRIPTION OF THE DRAWINGS

The teachings of the present disclosure can be readily understood by considering the following detailed description in conjunction with the accompanying drawings, in which:

FIG. 5 illustrates an example of a computing device, or computing system, specifically programmed to perform the steps, functions, blocks, and/or operations described herein.

To facilitate understanding, similar reference numerals have been used, where possible, to designate elements that are common to the figures.

DETAILED DESCRIPTION

Figure 1:
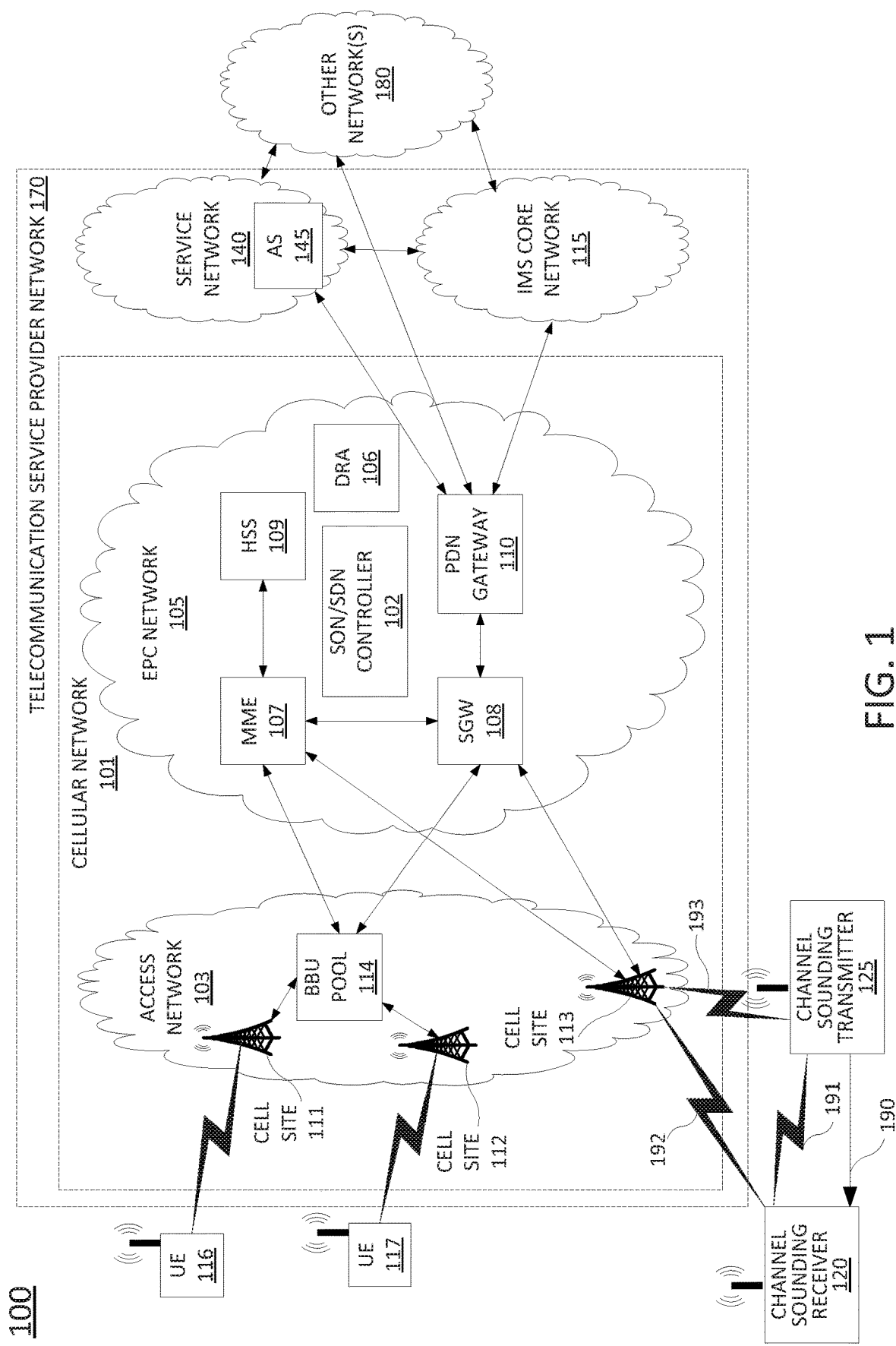
FIG. 1 illustrates an example system, in accordance with the present disclosure.

The present disclosure broadly discloses methods, computer-readable media, and devices for measuring wireless channel parameters using a phased array channel sounding transmitter. Developing 3GPP Fifth Generation (5G) standards include the use of millimeter wave frequencies (30 GHz to 300 GHz) as carrier frequencies. The propagation loss of air at such frequencies is relatively high. One technique to overcome this loss is the use of beamformed wireless communication. In beamformed communications, wireless signals are transmitted in a narrow beam. The concentration of energy in a narrow beam helps overcome the propagation loss of the wireless medium. Similarly, 5G receivers may also sense wireless signals in a narrow region of space, allowing the capture of a large amount of signal energy and correspondingly low amounts of noise and interference energy. This is relevant to channel sounding, as 5G channel models should provide metrics with respect to a spatial grid around the transmitter or the receiver.

For deployment and configuration of wireless network infrastructure, it is beneficial to obtain a wireless channel's propagation within the frequency bands of interest to the standard. The act of making such wireless channel propagation measurements is known as channel sounding. Channel sounding typically operates by transmitting a known wireless signal in the frequency band of interest by a channel sounding transmitter, and subsequently receiving this signal at a different location by a channel sounding receiver. Knowing both the transmitted and the received signal, the state of the channel at the time of transmission can be extracted, resulting in what may be referred to as a "channel snapshot." Multiple of such channel snapshots can be acquired by varying the hardware location, orientation, speed, time of transmission, and even the environment around the channel sounder transmitter and the channel sounding receiver. The resulting dataset of channel snapshots may be subsequently analyzed to extract channel models to be used for standards development, as well as network infrastructure deployment, configuration, and optimization.

Based on multiple antennas at both transmitters and receivers, a M×N (M transmit antennas and N receive antennas) multiple input multiple output (MIMO) channel sounding system is able to measure directional channel propagation at both ends of the wireless link (e.g., at the transmit and receive antennas) and improve resolution of the spatial multiple path parameters. In one example, a channel sounding system may transmit a known signal (broadly a "channel sounding signal" or "channel sounding waveform") via a first transmit beam direction of a channel sounding transmitter, and measure the channel parameters via all N receive antennas at the channel sounding receiver. The channel sounding transmitter may then switch to a second transmit beam direction and the process repeats until all M×N combinations have been performed. By way of example and without any limitation, a Zadoff-Chu (ZC)

sequence in the time domain may be used for channel sounding. In another example, in the case of frequency domain processing, the channel sounding signal may be inserted before an inverse Fast Fourier Transform (iFFT) stage in the transmitter. In one example, the channel sounding signal may be in accordance with a modulation coding scheme e.g., a binary phase shift keying (BPSK) modulation coding scheme, a quadrature phase shift keying (QPSK) modulation coding scheme, a frequency modulation (FM) scheme, an amplitude modulation (AM) scheme, a frequency shift keying (FSK) scheme, a modulation coding scheme based upon a precoding matrix indicator, or a modulation coding scheme based upon precoder cycling. Higher level encoding schemes such as 16-QAM, 64-QAM, and the like may also be used in other examples.

In one example, the present disclosure may comprise mobile channel sounding transmitters (and receivers) that include multiple phased array antennas, e.g., where radio frequency (RF) components, such as power amplifiers, variable phase shifters, and transceivers are integrated with the antennas elements of each phased array. In particular, examples of the present disclosure may provide a channel sounding system that may operate in one or more frequency bands for 5G communications, and which may determine measurements of wireless channel parameters (e.g., one or more "key performance indicators" (KPIs)), such as a complex impulse response, a path loss, a received signal strength (RSS), e.g., a reference signal received power (RSRP), a carrier-to-interference (CIR) ratio (or signal-to-noise ratio (SNR)), an excess delay, a root-mean-square (RMS) delay spread, an angular spread, a Doppler spread, a fade rate, an angle of arrival (AoA), and the like, along with spatial orientation information, such as azimuth and elevation angles, and locations associated with the measurements. Although examples of the present disclosure are applicable to a wide range of frequency bands, in one example, the present disclosure may relate to channel sounding in centimeter and millimeter wave ranges. For instance, for all of the examples herein, the considered wireless cellular communications standard may be the Third Generation Project (3GPP) New Radio (NR) and/or 5G radio access technology.

The channel sounding transmitter may comprise a device that is equipped to operate according to the specification of the considered wireless cellular communications standard (e.g., 5G millimeter wave multiple-in multiple-out (MIMO)). In one example, the channel sounding transmitter may include at least two phased array antennas arranged to provide a transmit beam coverage across 360 degrees in azimuth, and may be configured with the ability to simultaneously beam sweep multiple transmit beams for the respective phased array antennas to transmit multiple channel sounding waveforms from the mobile channel sounding transmitter (which, in one example, may comprise orthogonal waveforms/signals that are transmitted simultaneously via the respective transmit beams). In other words, the at least two phased array antennas provide transmit beams that are steerable so that for each azimuthal direction, at least one transmit beam is steerable to include the azimuthal direction within the half-power beam width angular coverage of the at least one transmit beam.

Similarly, the channel sounding receiver may comprise a device that is equipped to operate according to the specification of the considered wireless cellular communications standard (e.g., 5G millimeter wave multiple-in multiple-out (MIMO)). In one example, the channel sounding receiver may include at least one phased array antenna, e.g., up to three phased array antennas. To illustrate, the channel sounding receiver may include at least three phased array antennas arranged to provide a receive beam coverage across 360 degrees in azimuth, and may be configured with the ability to simultaneously beam sweep multiple receive beams for the respective phased array antennas to receive channel sounding waveforms from the mobile channel sounding transmitter. In other words, the at least three phased array antennas provide receive beams that are steerable so that for each azimuthal direction, at least one receive beam is steerable to include the azimuthal direction within the half-power beam width angular coverage of the at least one receive beam.

Antenna array geometry defines the placement of the antenna elements on the phased array antenna. For example, a uniform rectangular array (URA) geometry has antenna elements placed in a rectangular pattern with equal spacing between neighboring elements. Planar geometries such as the URA typically have a spatial region within which they can transmit or receive via a narrow beam (e.g., a half power beam width (HPBW) of less than 30 degrees angular spread, less than 15 degrees angular spread, less than 10 degrees angular spread, and so forth). In order to cover the entire 360 degree field of view in the azimuth plane around a channel sounding transmitter or a channel sounding receiver, multiple planar phased array antennas may be arranged side-by-side. For instance, for either or both of a channel sounding transmitter and a channel sounding receiver, three planar phased array antennas may be arranged in a generally triangular layout. In another example, four planar phased array antennas may be arranged in a generally square or rectangular layout with each phased array antenna covering at least 90 degrees in azimuth. In such case, if the azimuth spatial coverage of each phased array antenna is greater than or equal to 90 degrees, the four phased array antennas can combine to cover all 360 degrees. Similarly, a configuration of three phased array antennas may cover the entire azimuth field of view as long as each phased array antenna has greater than or equal to 120 degrees of coverage. In another example, for either or both of the channel sounding transmitter and the channel sounding receiver, the present disclosure may utilize a cylindrical phased array antenna, with antenna elements placed either uniformly or non-uniformly on the face of the array. A complete cylinder with antenna elements on the surface can provide 360 degrees of azimuthal coverage. In another example, two half-cylinder phased array antennas can also provide similar coverage.

It should be noted that in various examples, the phased array antennas may have different fields-of-view in an elevation plane. For example, the phased array antennas may have a field of view in elevation of 120 degrees, 90 degrees, 60 degrees, etc. The elevation field of view may be symmetric around the horizon (or a horizontal plane with respect to a device chassis) or may be offset, e.g., to provide greater coverage above or below a horizontal plane. For instance, the top edges of the phased array antennas may be angled towards each other, while the bottom edges of the phased array antennas may be angled away from each other. In another example, multiple phased array antennas may be arranged to provide 180 degrees of elevation coverage.

Appropriate control circuitry may also be paired with the phased array antennas. For example, in the channel sounding transmitter, if there are N phased array antennas, there may be N independent transmit beams that can be utilized simultaneously. In one example, the channel sounding transmitter may include N radio frequency (RF) front ends (including, for example: variable phase shifters, power amplifiers, diplexers or switches, upconverters, and the like)

and N digital baseband units (which may include transceivers) to upconvert the channel sounding waveforms that are to be transmitted via the respective N phased array antennas (where, in one example, the transmissions may be simultaneous). The baseband units may include digital-to-analog converters (DACs) to convert digital representations of channel sounding waveforms (which may be provided by a processing system of the channel sounding transmitter) to analog baseband representations of the channel sounding waveforms, which may then be upconverted via the RF front ends. A channel sounding transmitter with the ability to transmit N beams at the same time can sweep through the 360 degree field of view quickly by dividing the total azimuth field of view into N smaller coverage zones for each of the transmit beams of the N phased array antennas.

In one example, the N signals transmitted by the N phased array antennas can be from a single baseband unit via a switch (or bank of switches). The switch(es) may be used to direct channel sounding waveforms to one beam at any given time. In such an example, the transmitter device may sweep the beams through their respective fields of view in a sequential manner, resulting in a slower sweep of the 360 degree field of view. By placing additional switches and baseband transmitter units, the number of baseband units can be set anywhere between 1 to N, in order to achieve a desired balance of cost, device size, performance speed, etc. In another example, each phased array antenna may be provided with its own dedicated RF front end.

Similarly, in the channel sounding receiver, if there are N phased array antennas, there may be N independent receive beams that can be utilized simultaneously. In one example, the channel sounding receiver may include N radio frequency (RF) front ends (including, for example: variable phase shifters, power amplifiers, diplexers or switches, downconverters, and the like) and N digital baseband units (which may include transceivers) to sense the signals received via the respective N phased array antennas simultaneously. A receiver device with the ability to capture N beams at the same time can sweep through the 360 degree field of view quickly by dividing the total azimuth field of view into N smaller coverage zones for each of the receive beams of the N phased array antennas.

In one example, the N signals coming out of the N phased array antennas can be fed into a single baseband receiver via a switch (or bank of switches). The switch(es) may be used to select one beam at any given time. In such an example, the receiver device may sweep the beams through their respective fields of view in a sequential manner, resulting in a slower sweep of the 360 degree field of view. By placing additional switches and baseband receivers, the number of baseband receivers can be set anywhere between 1 to N, in order to achieve a desired balance of cost, device size, performance speed, etc. In another example, each phased array antenna may be provided with its own dedicated RF front end.

In one example, wireless channel parameter measurements may be determined in one or more digital baseband units of the channel sounding receiver. For instance, the digital baseband units may receive analog baseband signals from respective RF front ends and sample the analog baseband signals (e.g., an analog-to-digital conversion) to provide digital baseband signals. Each of the digital baseband units (or "baseband receivers") may be implemented as a programmable logic device (PLD), such as a field programmable gate array (FPGA) or the like, processing units, such as a central processing unit (CPU) a multi-core processor, or the like in conjunction with a memory, and/or a combination of CPU-based processing unit(s) and PLD(s).

In one example, the digital baseband units may perform various calculations to determine various measures of wireless channel parameters, such as a complex impulse response, a path loss, an RSS, a CIR, an excess delay, an RMS delay spread, an angular spread, a Doppler spread, a fade rate, an AoA, and so forth. Alternatively, or in addition, the digital baseband units may forward the digital baseband signals to a processor (or processors), such as a central processing unit (CPU) of the channel sounding receiver, to further determine various measurements of wireless channel parameters.

In one example, the channel sounding receiver does not calculate various measures of wireless channel parameters, or KPIs, in real-time, but rather may store digital baseband signals as the channel sounding receiver performs fast switching to sweep one or more receive beams through various angles of arrival (AoA) and obtain multiple digital baseband signals for the various receive beam direction(s), e.g., within a coherence time of the wireless channel. The channel sounding receiver may then, at a later time, calculate the various measures of wireless channel parameters from the stored digital baseband signals that are derived from the received channel sounding waveforms (e.g., via the digital baseband units and/or via a processing system including one or more other processors). Notably, the time to perform calculations to determine various measures of wireless channel parameters may be significant. For instance, for a given channel sounding location, the channel sounding receiver may fail to receive a full set of channel sounding waveforms in accordance with various settings of interest (e.g., a range of angles, a range of frequencies, a range of waveforms/signal types, etc.) within the coherence time if the channel sounding receiver was to also calculate the measure of wireless channel parameters as the channel sounding waveforms/signals are being received. Thus, by collecting the digital baseband signals and postponing the actual calculations of the measures of wireless channel parameters, the channel sounding system may better ensure that the requisite signals are received within the coherence time. In addition, this provides for more accurate measure(s) of the wireless channel parameter(s) as the received signals may be made closer in time than would otherwise be achieved.

In another example, the channel sounding receiver may store digital baseband signals and may then provide the digital baseband signals to the channel sounding transmitter at a later time (e.g., after receiving various channel sounding waveforms at one or more locations). In such an example, the channel sounding transmitter may perform similar calculations of the measures of wireless channel parameters. In still another example, the channel sounding receiver may provide the digital baseband signals to another device and/or processing system (e.g., a network-based server) which may then calculate measures of wireless channel parameters.

In accordance with the present disclosure, a channel sounding receiver may tag a wireless channel parameter measurement with directional/spatial orientation information, i.e., in addition to a location. In one example, the channel sounding receiver may calculate a direction, or spatial orientation of a receive beam with respect to a local coordinate system, e.g., a three dimensional space with dimensions/axis aligned to a length, a width, and a depth of the receiver device, for example. In one example, a channel sounding receiver may include at least three phased array antennas that may be arranged to provide at least three receive beams and to steer each of the at least three receive beams through receive beam directions/spatial orientations within a given azimuth and elevation range. In addition, in one example, the channel sounding receiver may be configured to associate each receive beam (or receive beam direction/orientation) with a vector/direction/spatial orientation in a local coordinate system that is fixed, e.g., with respect to the positions of the at least three phased array antennas. For instance, the channel sounding receiver may be configured with a mapping of receive beams to spatial orientations/directions in the local coordinate system.

It should be noted that other local coordinate systems may have a different alignment with respect to the channel sounding receiver (e.g., offset 30 degrees from the major dimensions/axis of the channel sounding receiver). In any case, a local orientation of a receive beam in a local coordinate system may be translated into a global orientation, e.g., in the global coordinate system. In one example, the translations may be based upon the difference between the local orientation and the global orientation, which can be estimated using a gyroscope and compass of the channel sounding receiver. The determination of a direction/orientation of a receive beam and the translation to a spatial orientation in a global coordinate system are described in greater detail below in connection with the example of FIG. 2.

In another example, the channel sounding receiver may associate the angle of arrival (AoA) with a wireless channel parameter measurement (and a location), (e.g., where the wireless channel parameter measurement relates to a received power). In one example, the channel sounding receiver does not tag a wireless channel parameter measurement (e.g., received signal strength) with spatial orientation information, but rather tags spatial orientation information of a measurement with the location. For instance, at a given location, the primary direction from which the signal energy arrives is recorded, but not the actual received signal strength. In one example, the channel sounding receiver may tag a digital baseband signal with a time stamp, location information, and/or directional/spatial orientation information (e.g., in an example where the channel sounding receiver does not calculate one or more measures of wireless channel parameters, and where the calculation(s) is/are instead performed at the channel sounding transmitter or elsewhere).

In one example, locations, or geographic positions may be determined at the channel sounding receiver via a Global Positioning System (GPS) unit, or may be derived using other location estimation methods, such as cell identifier (cell ID) based methods, observed time difference of arrival (OTDA) techniques, or barycentric triangulation. In this regard, it should be noted that any references herein to a channel sounding receiver may comprise a mobile channel sounding receiver, i.e., a device that is portable and which can be moved from location to location. For instance, a mobile channel sounding receiver may be moved with relative ease, such as one that may be carried by a person or wheeled on a small cart that may be pushed or pulled by a person. In addition, the orientation of the channel sounding receiver may be determined from a gyroscope and compass, allowing the channel sounding receiver device to determine a receive beam direction/spatial orientation, and to therefore measure wireless channel parameters with high spatial accuracy.

In addition, the mobile channel sounding transmitter may determine its own location in the same or a similar manner as the channel sounding receiver (and may be similarly equipped with a GPS and/or other requisite hardware) and may calculate a direction (and in one example, a distance) between the mobile channel sounding transmitter and the channel sounding receiver. The mobile channel sounding transmitter may then transmit channel sounding waveforms via one or more transmit beams using one or more phased arrays, e.g., accounting for the direction of the channel sounding receiver. For example, each transmit beam may comprise a relatively focused beam, e.g., with a HPBW of 15 degrees or less, or with a broader beam e.g., up to 60 to 90 degrees of HPBW centred on the direction of the channel sounding receiver, up to 120 degrees, etc.

It should also be noted that the mobile channel sounding transmitter may comprise a device that is portable and which can be moved from location to location. For instance, a mobile channel sounding transmitter may be moved with relative ease, such as one that may be carried by a person or wheeled on a small cart that may be pushed or pulled by a person. In addition, the use of a mobile channel sounding transmitter may enable faster channel sounding as compared to channel sounding via a base station (e.g., an NR base station) that is used as a channel sounding transmitter. For instance, an NR base station may serve various subscribers' endpoint devices/user equipment and may therefore not be able to dedicate sufficient resources to channel sounding (e.g., the base station may not be able to transmit channel sounding waveforms such that the channel sounding receiver can receive these waveforms within the coherence time of the wireless channel).

In one example, the channel sounding receiver may store one or more wireless channel parameter measurements (and/or digital baseband signals) in a record, along with the spatial orientation information and a location associated with the wireless channel parameter measurements (and/or digital baseband signals), e.g., in a local memory. In one example, the channel sounding receiver may be deployed to obtain wireless channel parameter measurements (and/or digital baseband signals) at various locations within an environment and may collect and store all of the measurements (and/or digital baseband signals). The measurements (and/or digital baseband signals) may then be retrieved at a later time and transferred to another device or system for storage and/or analysis. For instance, associated data from the mobile channel sounding transmitter regarding the transmit beam(s), the channel sounding waveforms, the location(s) of the mobile channel sounding transmitter, etc. may be stored and/or uploaded to the same device or system and correlated with the measurements (and/or digital baseband signals) of the channel sounding receiver.

In another example, the measurements (and/or digital baseband signals) from the channel sounding receiver may be transferred to the mobile channel sounding transmitter for storage and/or analysis. This can be done after obtaining a series of measurements (and/or digital baseband signals), e.g., via a cable connection when the mobile channel sounding transmitter and receiver are together in a same location, or may be transmitted wirelessly by the channel sounding receiver to the mobile channel sounding transmitter via a wireless side link.

In one example, the channel sounding transmitter may store various information in connection with channel sounding waveforms that are transmitted, such as a timestamp, spatial orientation information (e.g., a transmit beam direction, or angle of departure (AoD)), and a location. This information may then be correlated with corresponding information of the channel sounding receiver. For instance, a received signal strength (RSS) for a particular angle of arrival at a location may be correlated with a location, angle of departure, and transmit strength of the channel sounding transmitter to provide a more comprehensive wireless channel snapshot. The channel sounding transmitter may determine its location as described above. In addition, the channel sounding transmitter may translate a transmit beam direction/AoD in a local coordinate system into a transmit beam direction/AoD in a global coordinate system in the same or a similar manner as described above in connection with the channel sounding receiver. For example, translations may be based upon the difference between the local orientation and the global orientation, which can be estimated using a gyroscope and compass of the channel sounding transmitter. These and other aspects of the present disclosure are discussed in greater detail below in connection with the examples of FIGS. 1-5.

To better understand the present disclosure, FIG. 1 illustrates an example network, or system 100 in which examples of the present disclosure for measuring wireless channel parameters using a phased array channel sounding transmitter. In one example, the system 100 includes a telecommunication service provider network 170. The telecommunication service provider network 170 may comprise a cellular network 101 (e.g., a 4G/Long Term Evolution (LTE) network, a 4G/5G hybrid network, or the like), a service network 140, and a core network, e.g., an IP Multimedia Subsystem (IMS) core network 115. The system 100 may further include other networks 180 connected to the telecommunication service provider network 170. FIG. 1 also illustrates various mobile endpoint devices, e.g., user equipment (UE) 116 and 117. The UE 116 and 117 may each comprise a cellular telephone, a smartphone, a tablet computing device, a laptop computer, a pair of computing glasses, a wireless enabled wristwatch, or any other cellular-capable mobile telephony and computing devices (broadly, "a mobile endpoint device").

In one example, the cellular network 101 comprises an access network 103 and a core network, Evolved Packet Core (EPC) network 105. In one example, the access network 103 comprises a cloud RAN. For instance, a cloud RAN is part of the 3$^{rd}$ Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114. In accordance with the present disclosure, any one or more of cell sites 111-113 may be deployed with antenna and radio infrastructures, including multiple input multiple output (MIMO) and millimeter wave antennas. In one example, any one or more of cell sites 111-113 may comprise one or more directional antennas (e.g., capable of providing a half-power azimuthal beamwidth of 60 degrees or less, 30 degrees or less, 15 degrees or less, etc.). In one example, any one or more of cell sites 111-113 may comprise a 5G "new radio" (NR) base station.

In one example, the channel sounding receiver 120 and the channel sounding transmitter 125 (e.g., a mobile channel sounding transmitter) may be used to determine a plurality of measurements of at least one wireless channel parameter (broadly, "channel sounding"). In one example, channel sounding receiver 120 may comprise a user equipment, e.g., a mobile endpoint device comprising a cellular telephone, a smartphone, a tablet computing device, a laptop computer, or any other cellular-capable mobile telephony and computing. In one example, channel sounding receiver 120 may comprise a dedicated channel sounding device. Similarly, the channel sounding transmitter 125 may comprise a dedicated channel sounding device.

In one example, the channel sounding transmitter 125 may comprise two or more phased array antennas (e.g., a quantity of M phased arrays), M RF front ends, and 1-M digital baseband units. In one example, the channel sounding transmitter 125 may transmit channel sounding signals (also referred to as "channel sounding waveforms") via multiple transmit beams for reception by the channel sounding receiver 120. In general, the channel sounding waveforms may have a variety of characteristics, such as those described above, that may be specified by the channel sounding transmitter 125 (and/or by an operator thereof). In one example, the channel sounding transmitter 125 may record location information, spatial orientation information (and timing information) of the respective transmit beams.

In one example, the channel sounding receiver 120 may be used to receive channel sounding waveforms that are transmitted in an environment from the channel sounding transmitter 125, where the channel sounding waveforms, as received, may be used to calculate or determine the measures of various wireless channel parameters such as: a complex impulse response, a path loss, an RSS, a CIR, an excess delay, an RMS delay spread, an angular spread, a Doppler spread, a fade rate, an AoA, and so forth. For illustrative purposes, the "wireless channel(s)" for which the channel sounding receiver 120 is obtaining channel sounding waveforms may be indicated by reference numeral 190 in FIG. 1.

In one example, the channel sounding receiver 120 includes one or more phased array antennas that may be activated and deactivated according to a schedule or otherwise synchronized to the transmission of channel sounding waveforms. In one example, each phased array antenna may be paired with an RF front end to receive radio frequency (RF) signals from the respective phased array antenna and convert the signals into baseband signals. A digital sampling unit (e.g., an analog-to-digital converter (ADC) of a baseband processing unit) may convert the baseband signals into digital representations of the channel sounding waveforms that are received via the respective phased array antennas.

For instance, the digital sampling unit(s) may oversample the analog baseband signals at a sampling interval under the control of timing signals from a clock circuit to create the digital representations of the channel sounding waveforms. In one example, each phased array may cover 90-180 degrees in azimuth, 90-180 degrees in elevation, etc., and the phased arrays may collectively cover 360 degrees in azimuth and 120-180 degrees in elevation (or greater, e.g., to account for angles below horizon).

In one example, the baseband processing units may output the digital representations of the channel sounding waveforms to a processor unit that is configured to perform various operations for determining measures of wireless channel parameters, as described herein. For instance, the channel sounding receiver 120 may calculate, based upon the digital representations of the channel sounding waveforms, a phase difference between channel sounding waveforms received via respective antennas. The processor unit may further determine an angle of arrival (AoA) based upon the antenna positions and the phase difference.

In one example, the channel sounding receiver 120 may receive a reference copy or copies of the channel sounding waveforms(s) and/or a set of parameters characterizing the channel sounding waveforms, from the channel sounding transmitter 125. Accordingly, the channel sounding receiver 120 may determine a carrier-to-interference ratio (CIR) by comparing a sequence received via one of the phased array antennas with a reference copy. Similarly, the channel sounding receiver 120 may calculate a complex impulse response, a path loss, an RSS, a CIR, an excess delay, an RMS delay spread, an angular spread, a Doppler spread, a fade rate, an AoA, or the like, from the digital representations of the channel sounding waveforms.

In one example, the channel sounding receiver 120 does not calculate various measures of wireless channel parameters, or KPIs, in real-time, but rather may store digital baseband signals as the channel sounding receiver 120 performs fast switching to sweep one or more receive beams through various angles of arrival (AoA) and obtain multiple digital baseband signals for the various receive beam direction(s), e.g., within a coherence time of the "wireless channel(s)" 190. The channel sounding receiver may then, at a later time, calculate the various measures of wireless channel parameters from the stored digital baseband signals that are derived from the received channel sounding waveforms (e.g., via the digital baseband units and/or via a processing system including one or more other processors).

Alternatively, or in addition, the channel sounding receiver 120 may store digital baseband signals and may then provide the digital baseband signals to the channel sounding transmitter 125 at a later time (e.g., after receiving various channel sounding waveforms at one or more locations). In such an example, the channel sounding transmitter 125 may perform similar calculations of the measures of wireless channel parameters. In still another example, the channel sounding receiver 120 may provide the digital baseband signals to another device and/or processing system (e.g., a network-based server, such as application server (AS) 145) which may then calculate measures of wireless channel parameters.

In one example, the channel sounding transmitter 125 and the channel sounding receiver 120 may establish a wireless side link for exchanging timing information as well as for conveying information regarding the channel sounding waveforms (e.g., a reference copy or copies, and/or modulation parameters, beam information, etc.). To illustrate, a wireless side link may include a communication session via cellular network infrastructure, e.g., including at least wireless links 192 and 193. Alternatively, the wireless side link may comprise a wireless communication session via a non-cellular wireless networking protocol, such as IEEE 802.11/Wi-Fi, or the like, or via a wireless communication session in accordance with a set of non-restricted frequency resources (e.g., using ISM band frequencies). In such examples, the non-cellular wireless communication session may include an access point (AP) coordinator (not shown) and/or a peer-to-peer session (represented by wireless link 191 in FIG. 1). In addition, in such examples, the non-cellular wireless link(s) may comprise out-of-band wireless links (which use different frequencies from the channel sounding waveforms and the "wireless channel(s)" 190. In examples where the wireless side link comprises an out-of-band wireless link, the channel sounding receiver 120 and the channel sounding transmitter 125 may use a different set of antennas, RF front ends, and/or baseband units than those which are used for channel sounding/channel property measurements in accordance with the present disclosure.

In still another example, wireless link 190 may represent an in-band wireless link, which may share the same frequency resources as the channel sounding waveforms and/or the "wireless channel(s)" 190, but which may utilize different time resources (different time blocks). For instance, the channel sounding waveforms may be for millimeter wave frequencies (30 GHz to 300 GHz) as carrier frequencies, where the wireless side link utilizes the same set of frequencies or frequency bands. In all of these examples, the wireless side link may be used to transmit a synchronization signal by the channel sounding transmitter 125, in addition to other information regarding one or more channel sounding waveforms, such as reference copies or parameters thereof, beam information, timing information, etc. The wireless side link may also be used by the channel sounding receiver 120 to notify the channel sounding transmitter 125 that the channel sounding receiver 120 is in position and ready to measure, to confirm that a clock circuit of the channel sounding receiver 120 is matched to the synchronization signal, to confirm successful measurements to the channel sounding transmitter 125 or to indicate one or more failed measurements, to report the measurements to the channel sounding transmitter 125, and so forth.

In one example, the channel sounding receiver 120 may store one or more wireless channel parameter measurements (and/or digital baseband signals) in a record, along with the spatial orientation information and a location associated with the wireless channel parameter measurements (and/or digital baseband signals), e.g., in a local memory. In one example, the channel sounding receiver 120 may be deployed to obtain wireless channel parameter measurements (and/or digital baseband signals) at various locations within an environment and may collect and store all of the measurements (and/or digital baseband signals). The measurements (and/or digital baseband signals) may then be retrieved at a later time and transferred to another device or system for storage and/or analysis. For instance, associated data from the mobile channel sounding transmitter regarding the transmit beam(s), the channel sounding waveforms, the location(s) of the mobile channel sounding transmitter, etc. may be stored and/or transferred to the channel sounding transmitter 125 for storage and/or analysis. This can be done after obtaining a series of measurements (and/or digital baseband signals), e.g., via a cable connection when the channel sounding transmitter 125 and channel sounding receiver 120 are together in a same location, or may be transmitted wirelessly by the channel sounding receiver 120 to the channel sounding transmitter 125 via a wireless side link.

In one example, the channel sounding transmitter 125 may store various information in connection with channel sounding waveforms that are transmitted, such as a timestamp, spatial orientation information (e.g., a transmit beam direction, or angle of departure (AoD)), and a location. This information may then be correlated with corresponding information of the channel sounding receiver 120. For instance, a received signal strength (RSS) for a particular angle of arrival at a location may be correlated with a location, AoD, and transmit strength of the channel sounding transmitter 125 to provide a more comprehensive snapshot of the wireless channel(s) 190.

In one example, the channel sounding receiver 120 and channel sounding transmitter 125 may each comprise all or a portion of a computing device or system, such as computing system 500, and/or processing system 502 as described in connection with FIG. 5 below, and may be configured to provide one or more functions for measuring wireless channel parameters using a phased array channel sounding transmitter, and for performing various other operations in accordance with the present disclosure. For instance, a channel sounding system comprising channel sounding transmitter 125 (and/or channel sounding transmitter 125 in conjunction with channel sounding receiver 120) may be configured to perform functions such as those described below in connection with the example method 400 of FIG. 4.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below, and which may include central processing units (CPUs), graphics processing units (GPUs), programmable logic devices (PLDs), and so forth) or multiple computing devices collectively configured to perform various steps, functions, and/or operations in accordance with the present disclosure.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, cell sites 111 and 112 in the access network 103 are in communication with the EPC network 105 via baseband units in BBU pool 114. In operation, UE 116 may access wireless services via the cell site 111 and UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-cell handovers and as the anchor for mobility between 5G, LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway 110 is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In one example, service network 140 may comprise one or more devices, such as application server (AS) 145 for providing services to subscribers, customers, and or users. For example, telecommunication service provider network 170 may provide a cloud storage service, web server hosting, and other services. As such, service network 140 may represent aspects of telecommunication service provider network 170 where infrastructure for supporting such services may be deployed. In one example, AS 145 may comprise all or a portion of a computing device or system, such as computing system 500, and/or processing system 502 as described in connection with FIG. 5 below, specifically configured to provide one or more service functions in accordance with the present disclosure, such as a network-based secure data storage for wireless channel parameter measurement records. For instance, channel sounding receiver 120 and/or channel sounding transmitter 125 may forward measurements of wireless channel parameters to AS 145 for storage. Either or both of channel sounding receiver 120 and channel sounding transmitter 125 may also forward additional data to AS 145 for storage, such as reference copies of the channel sounding waveform(s) and/or parameters thereof, transmit beam information, time stamp information, location information of the channel sounding receiver 120 and channel sounding transmitter 125, and so forth. Although a single application server, AS 145, is illustrated in service network 140, it should be understood that service network 140 may include any number of components to support one or more services that may be provided to one or more subscribers, customers, or users by the telecommunication service provider network 170.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 102.

In one example, SON/SDN controller 102 may function as a self-optimizing network (SON) orchestrator that is responsible for activating and deactivating, allocating and deallocating, and otherwise managing a variety of network components. In one example, SON/SDN controller 102 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, channel sounding may utilize multiple channel sounding receivers to receive channel sounding signals/waveforms from channel sounding transmitter 125. Similarly, multiple mobile channel sounding transmitters may be utilized for channel sounding in conjunction with channel sounding receiver 120 and/or multiple channel sounding receivers.

In one example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, SON/SDN controller 102 may be spilt into separate components to operate as a SON orchestrator and a SDN controller, respectively. Similarly, although the SON/SDN controller 102 is illustrated as a component of EPC network 105, in another example SON/SDN controller 102, and/or other network components may be deployed in an IMS core network 115 instead of being deployed within the EPC network 105, or in other portions of system 100 that are not shown, while providing essentially the same functionality.

In addition, although aspects of the present disclosure have been discussed above in the context of a long term evolution (LTE)-based core network (e.g., EPC network 105), examples of the present disclosure are not so limited. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. For instance, in such a network, application server (AS) 145 of FIG. 1 may represent an application function (AF) for adjusting aspects of a cellular network in response to measurements of wireless channel parameters by a receiver device, and for performing various other operations in accordance with the present disclosure. In addition, any one or more of cell sites 111-113 may comprise 2G, 3G, 4G and/or LTE radios, e.g., in addition to 5G new radio (NR) functionality. For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 2:
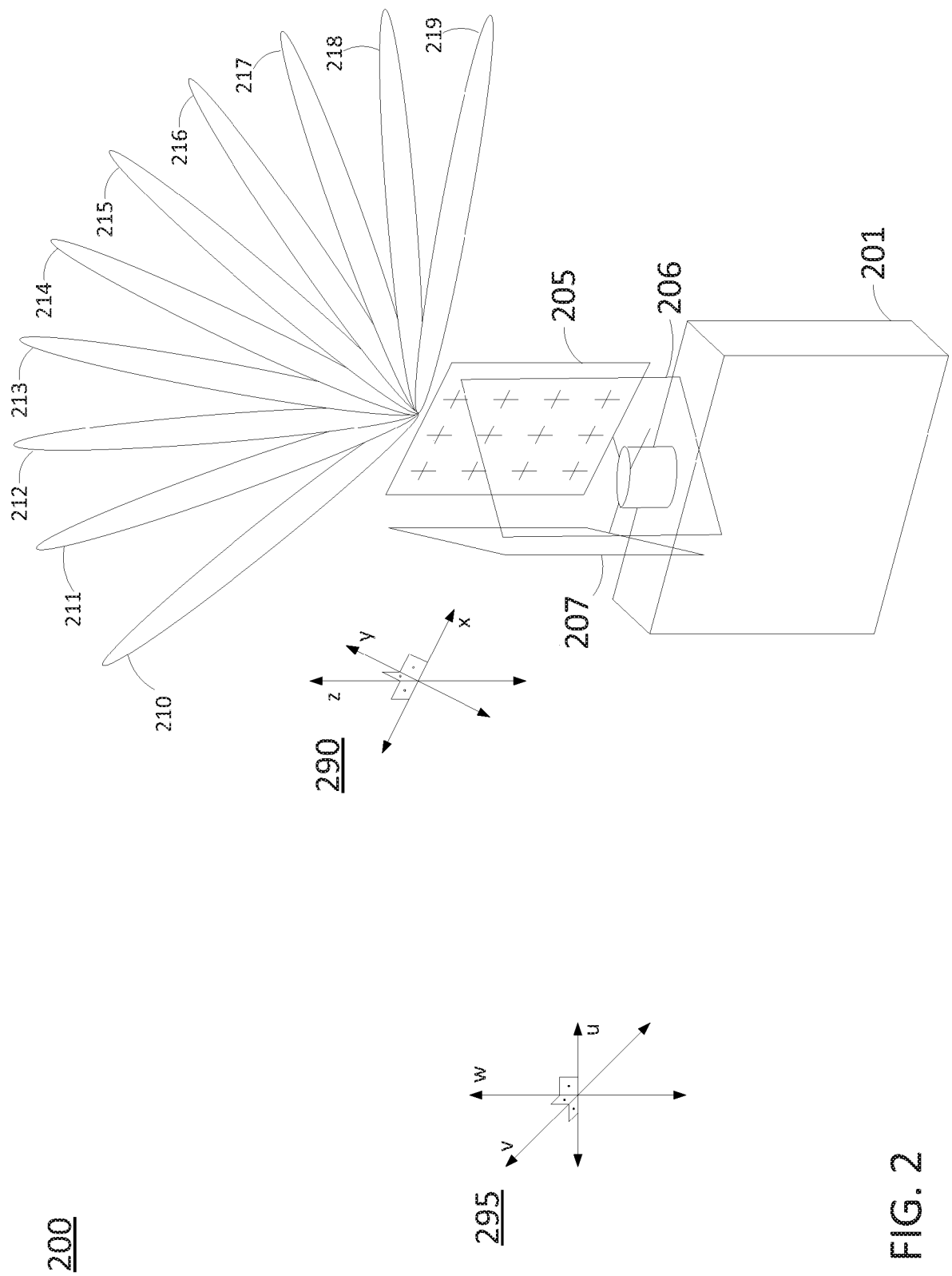
FIG. 2 illustrates an example translation of spatial orientation information of a local coordinate system with respect to a channel sounding transmitter into spatial orientation information in a global coordinate system, in accordance with the present disclosure.

FIG. 2 illustrates an example translation of spatial orientation information of a local coordinate system with respect to phased array antennas into a global coordinate system. In particular, FIG. 2 illustrates an environment 200 containing a channel sounding transmitter 201 with at least three phased array antennas 205-207. It should be noted that the example of FIG. 2 is provided for illustrative purposes in connection with just one illustrative architecture comprising a plurality of phased array antennas. Thus, the following discussion is equally applicable to other arrangements of phased array antennas, such as four phased array antennas in a rectangular or square layout, two half-cylindrical phased array antennas, and so forth.

As illustrated in FIG. 2, the orientation of phased array antennas 205-207 is shown with respect to local coordinate system 290 containing axis (x, y, z). A global coordinate system 295 having a different orientation and containing axis (u, v, w) is also illustrated in FIG. 2. The channel sounding transmitter 201 may be configured to transmit multi-path and/or spatial diversity signals, e.g., via transmit beam directions 210-219 of phased array antenna 205. Each of the transmit beam directions 210-219 may have different azimuth and elevation bearings from the other transmit beam directions of transmit beam directions 210-219. In one example, the transmit beam directions 210-219 may be identified by transmit beam indexes/indices or logical beam identifiers (beam IDs).

In one example, the channel sounding transmitter 201 can transmit a wireless signal (e.g., a channel sounding waveform) on a transmit beam that is oriented in one of the transmit beam directions 210-219 via selection/control of voltage(s) and/or phase(s) in the transmit circuitry associated with one or more given antenna elements of the phased array antenna 205, or via a logical index associated with a respective transmit beam direction 210-219. The channel sounding transmitter 201 may also translate or map each of the transmit beam directions 210-219 to a set of angles (or angles and magnitudes), n-tuples of coordinates defining a unit vector (or defining a magnitude and direction/orientation), or any other definitive units of local coordinate system 290, thereby giving the transmit beam directions 210-219, identified with a logical "beam ID," a physical spatial direction/orientation with respect to the local coordinate system 290. For instance, the channel sounding transmitter 201 may be configured by a manufacturer or operator with such a mapping by utilizing combinations of voltage and/or phase settings, and observing and recording actual transmit beam directions. A similar procedure may be applied to transmit beams (and transmit beam directions) associated with phased array antennas 206 and 207.

In one example, the local coordinate system 290 may be mapped or translated to the global coordinate system 295. For instance, global coordinate system 295 may have two dimensions corresponding to a planar estimation of the surface of the Earth (e.g., the "u" axis and "v" axis in FIG. 2), with the third dimension (e.g., the "w" axis) being normal to the plane. In addition, the planar estimation of the surface of the Earth can also be aligned such that one dimension is north-south (e.g., the "v" axis) and another dimension is east-west (e.g., the "u" axis). Accordingly, the orientations of the (x, y, z) axis of local coordinate system 290 relative to the (u, v, w) axis of global coordinate system 295 may be determined from a gyroscope and compass of the channel sounding transmitter 201. The transmit beam directions 210-219 may be similarly translated into directions/orientations in the global coordinate system 295 via the same mapping.

In one example, a location of the channel sounding transmitter 201 in local coordinate system 290 may be translated into a location in global coordinate system 295. For instance, channel sounding transmitter 201 may estimate its position relative to several base stations/cell sites using observed time difference of arrival (OTDA). Once channel sounding transmitter 201 determines its location relative to these base stations/cell sites, the channel sounding transmitter 201 may then determine an absolute location (e.g., a latitude and a longitude) from the location relative to fixed known locations of the base stations/cell sites. However, in another example, the channel sounding transmitter 201 may include a GPS receiver such that channel sounding transmitter 201 may determine an absolute location (e.g., in global coordinate system 295) which may comprise a standard latitude and longitude.

In one example, the channel sounding transmitter 201 may store various information in connection with channel sounding waveforms that are transmitted, such as a timestamp, spatial orientation information (e.g., a transmit beam direction, or angle of departure (AoD)), and a location. This information may then be correlated with corresponding information from a channel sounding receiver. For instance, a received signal strength (RSS) for a particular angle of arrival at a location may be correlated with a location of the channel sounding transmitter 201, an angle of departure and transmit strength of the channel sounding signal, and so forth to provide a more comprehensive snapshot of the wireless channel(s) being measured.

It should be noted that in a channel sounding system of the present disclosure, a channel sounding receiver may have similar components and a similar configuration as the channel sounding transmitter 201, and may similarly translate receive beam directions in a local coordinate system into receive beam directions in the same global coordinate system as the channel sounding transmitter 201. In examples where locations are determined using OTDA from cell sites, the channel sounding receiver may also translate a location in a local coordinate system into a location in the same global coordinate system as the channel sounding transmitter 201.

To illustrate, for a given location in the local coordinate system 290 corresponding to a location in the global coordinate system 295, the channel sounding receiver may collect a set of measurements of one or more wireless channel parameters (and/or a set of digital baseband signals). For example, for each spatial direction/receive beam direction, the channel sounding receiver may set the phase and/or the voltage driving each antenna element of a phased array antenna according to a look up table where each entry corresponds to a receive beam index, receive a waveform (a channel sounding waveform) via the receive beam pointed in a corresponding one of the receive beam directions, and generate and store a digital baseband signal derived from the received waveform. In one example, the channel sounding receiver may later calculate or determine the measures of various wireless channel parameters based upon the stored digital baseband signals. Thus, for the given location the channel sounding receiver will sample the space according to the receive beam directions in the look-up table. Furthermore, each wireless channel parameter measurement and/or digital baseband signal may be associated with a position and orientation of the channel sounding receiver.

Figure 3:
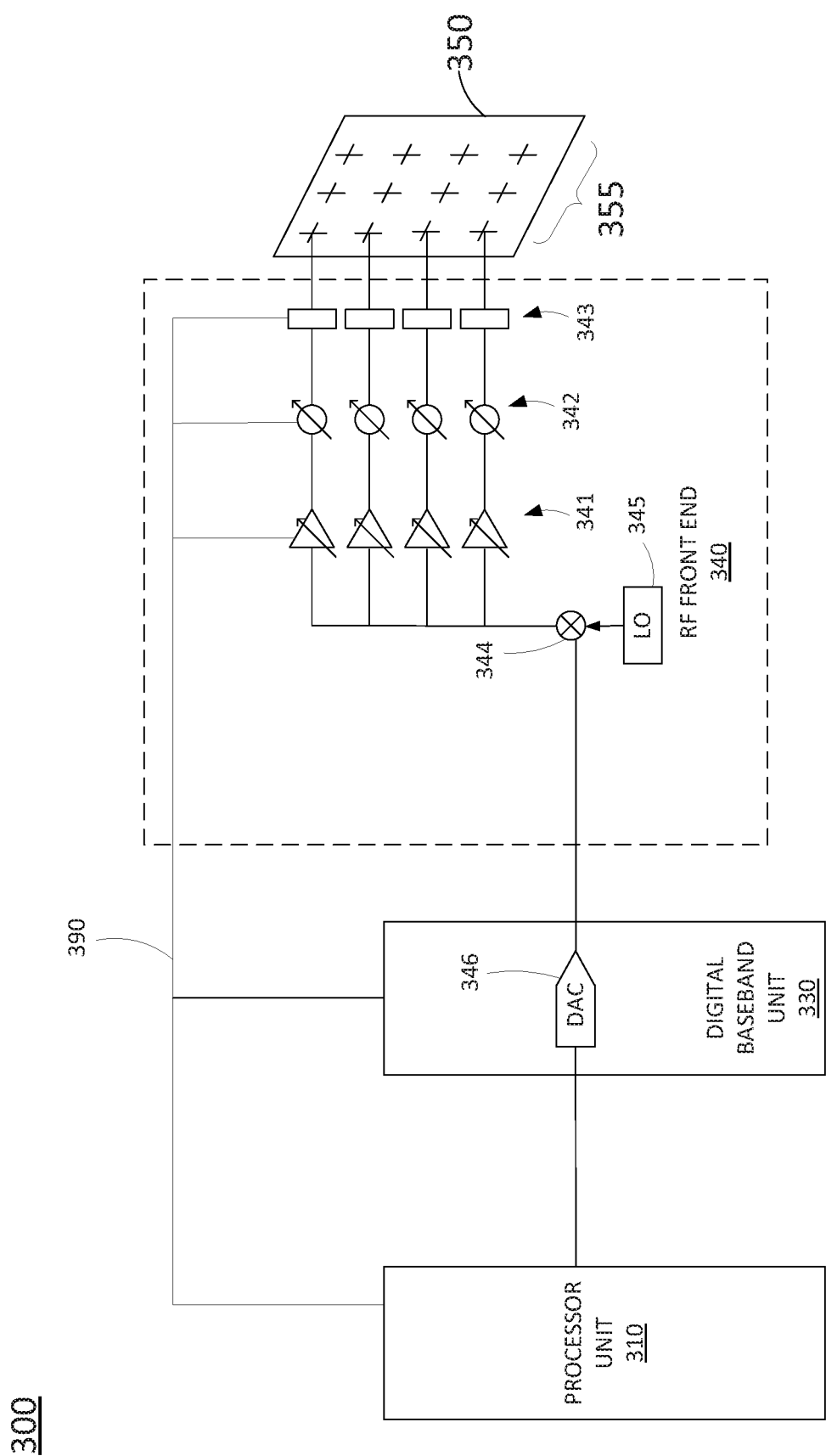
FIG. 3 illustrates a portion of an example channel sounding transmitter, in accordance with the present disclosure.

FIG. 3 illustrates a portion of an example channel sounding transmitter 300, in accordance with the present disclosure. As illustrated in FIG. 3, channel sounding transmitter 300 includes a phased array antenna 350 having a plurality of antenna elements 355. The phased array antenna 350 may be coupled to a radio frequency (RF) front end 340. RF front end 340 may comprise a circuit between the phased array antenna 350 and a digital baseband unit 330 (e.g., a 5G radio transceiver). In the example of FIG. 3, the RF front end 340 includes a plurality of filters 343, a plurality of variable phase shifters 342, and a plurality of variable gain amplifiers 341. RF front end 340 may further include a RF-to-baseband upconverter 344 that is controlled by local oscillator (LO) 345 and which may up-convert baseband frequency range signals to RF signals.

The processor unit 310 may generate digital representations of channel sounding waveforms and provide these digital representations to digital baseband unit 330. The digital-to-analog converter (DAC) 346 may obtain the digital representations of channel sounding waveforms and output baseband frequency range representations of the channel sounding waveforms. The baseband frequency range representations may then be up-converted to the channel sounding waveforms (e.g., RF signals) by the baseband-to-RF upconverter 344.

In one example, processor unit 310 may adjust the gain(s) of variable gain amplifiers 341 and/or the phase delays of variable phase shifters 342 via control lines 390 to provide a transmit beam having specified characteristics (e.g., beam direction, beam width, transmit signal strength/gain, etc.). In one example, the pass band of filters 343 may also be controlled via control lines 390. The control of these elements of RF front end 340 may be based upon the various criteria, including the bit sequences of the channel sounding waveform(s) and/or other characterization parameters of the channel sounding waveform(s). In one example, the processor unit 310 may also configure digital baseband unit 330 and/or DAC 346 to function in a particular manner, e.g., based upon the characterization parameters of the channel sounding waveform(s) to be transmitted.

In one example, the processor unit 310 may comprise all or a portion of a computing device or system, such as system 500, and/or processor 502 as described in connection with FIG. 5 below. In one example, the processor unit 310 may perform functions, such as communicating with the a network-based server and/or a channel sounding receiver to obtain reference copies of channel sounding waveforms or characterization parameters of the channel sounding waveform(s) that are to be transmitted. The characterization parameters may include: a transmit power, a waveform/sequence indication, timing indication (e.g., transmission duration, periodicity, offset, and the like), frequency location (e.g. sub-band index, grid alignment, transmission bandwidth), and so forth.

In one example, the processing unit 310 may store various information in connection with channel sounding waveforms that are transmitted, such as a timestamp, spatial orientation information (e.g., a transmit beam direction, or angle of departure (AoD)), and a location. This information may then be correlated with corresponding information from a channel sounding receiver. For instance, a received signal strength (RSS) for a particular angle of arrival at a location of a channel sounding receiver may be correlated with a location of the channel sounding transmitter 300, an angle of departure and transmit strength of the channel sounding signal, and so forth to provide a more comprehensive snapshot of the wireless channel(s) being measured.

It should also be noted that FIG. 3 illustrates one transmit path of channel sounding transmitter 300 that includes phased array antenna 350. However, channel sounding transmitter 300 may include a plurality of additional phased array antennas, RF front ends, and digital baseband units coupled to processor unit 310 that are the same or substantially similar to the portion of channel sounding transmitter 300 illustrated in FIG. 3. Thus, processor unit 310 may also control aspects of other RF front ends to steer transmit beams via respective phased array antennas, may generate digital representations to be converted into the channel sounding waveform(s), and so forth.

It should also be noted that the example of FIG. 3 provides just one example of a transmit path of a channel sounding transmitter in accordance with the present disclosure. For instance, in another example, DAC 346 may be included in RF front end 340, e.g., instead of in the digital baseband unit 330. In still another example, the filters 343 may comprise diplexers which may be configured and reconfigured for transmit and receive modes, respectively. In one example, the antenna elements 355 may comprise dual polarization antenna elements. However, for ease of illustration, the portion of the channel sounding transmitter 300 depicted in FIG. 3 may be related to one of the polarizations. Thus, these and other modifications are all contemplated within the scope of the present disclosure.

In addition, in a channel sounding system of the present disclosure, a channel sounding receiver may have similar components and a similar configuration as the channel sounding transmitter 300. For example, a channel sounding receiver may include at least one phased array antenna having a plurality of antenna elements coupled to at least one radio frequency (RF) front end with a plurality of filters, a plurality of variable phase shifters, and a plurality of variable gain amplifiers, and a RF-to-baseband downconverter that is controlled by a local oscillator (LO) and which may down-convert received signals to a baseband frequency range. The RF-to-baseband downconverter may feed received and down-converted signals (e.g., analog baseband signals) to an analog-to-digital converter (ADC) of a digital baseband unit, which may sample the analog baseband signals to output digital baseband signals. For instance, the ADC may oversample the analog baseband signals at a sampling interval under the control of timing signals from a clock circuit (e.g., including a rubidium reference clock or the like) to create digital representations of the channel sounding waveforms that are received (broadly, "digital baseband signals"). The channel sounding receiver may also include a processing system to store the digital baseband signals and/or to calculate one or more measures of various wireless channel parameters, to provide the digital baseband signals and/or measure(s) of wireless channel parameters to the channel sounding transmitter 300, and so forth. In one example, certain measurements of wireless channel parameters may be determined in a digital baseband unit of the channel sounding receiver, e.g., as an alternative or in addition to determining measurements of wireless channel parameters by the processor unit. In such an example, the digital baseband unit may forward measurements of one or more wireless channel parameters to the processor unit of the channel sounding receiver, e.g., for further tagging with location and/or spatial orientation information.

Figure 4:
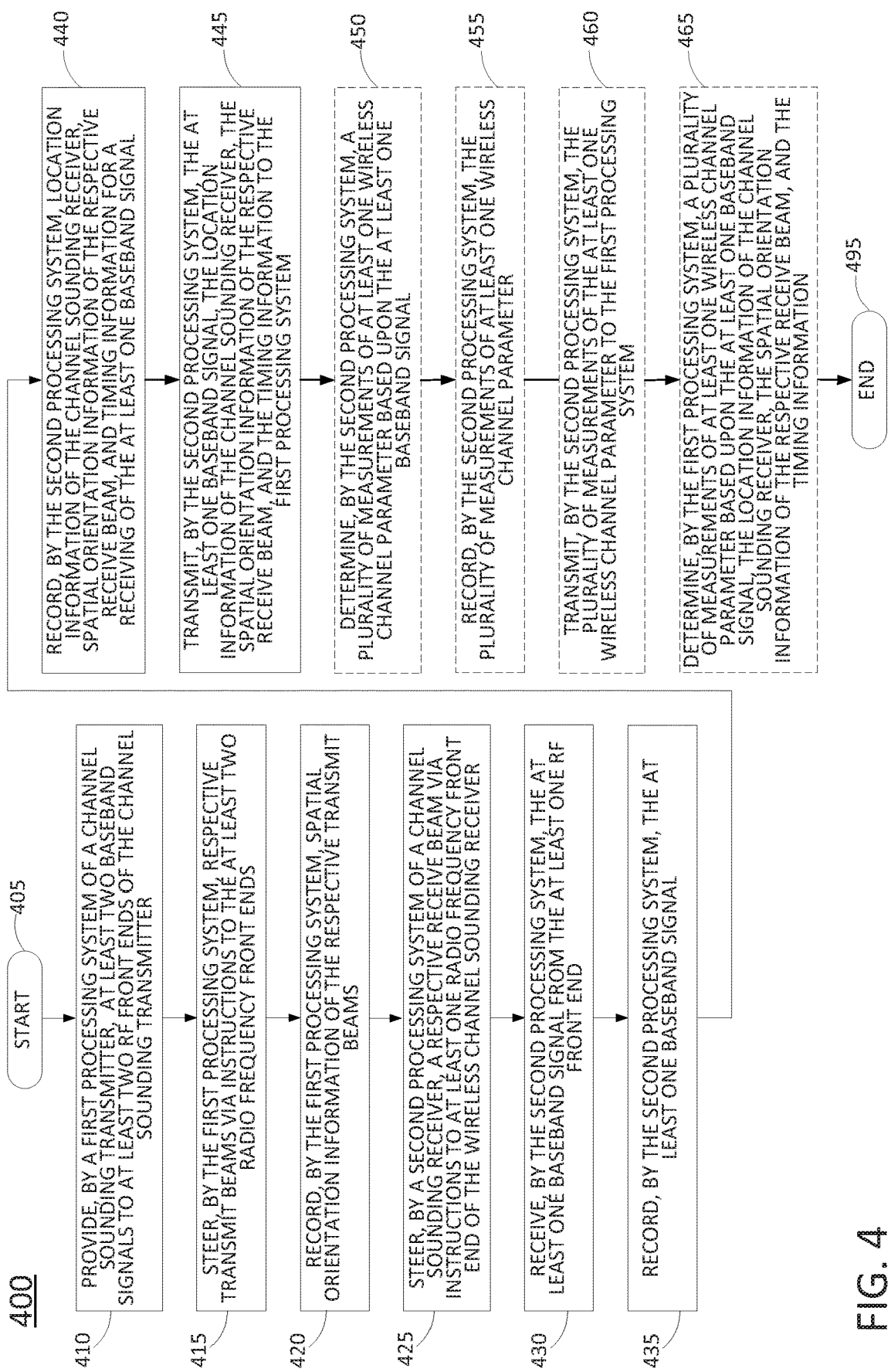
FIG. 4 illustrates a flowchart of an example method for measuring wireless channel parameters using a phased array channel sounding transmitter.

FIG. 4 illustrates a flowchart of an example method 400 for measuring wireless channel parameters using a phased array channel sounding transmitter, in accordance with the present disclosure. In one example, steps, functions and/or operations of the method 400 may be performed by a channel sounding system including at least a first processing system (e.g., comprising a channel sounding transmitter, or any one or more components thereof, such as one or more processors, baseband units, transceivers, antennas or antenna arrays (e.g., phased array antennas), and so forth). In one example, the channel sounding system may also include a second processing system (e.g., comprising channel sounding receiver, or any one or more components thereof, such as one or more processors, baseband units, transceivers, antennas or antenna arrays (e.g., phased array antennas), and so forth). In accordance with the present disclosure, a processing system may include one or more processors, which can include CPUs, PLDs, or a combination thereof. For instance, a processing system may include central processing unit, a digital baseband unit, and so forth. In one example, the steps, functions, or operations of method 400 may be performed by a computing device or system 500, and/or a processing system 502 as described in connection with FIG. 5 below, or multiple instances of the computing device or system 500. For instance, the computing device 500 may represent at least a portion of a mobile channel sounding transmitter in accordance with the present disclosure. Similarly, the computing device 500 may represent at least a portion of a mobile channel sounding receiver in accordance with the present disclosure. For illustrative purposes, the method 400 is described in greater detail below in connection with an example performed by at least a first processing system. The method 400 begins in step 405 and proceeds to step 410.

At step 410, a first processing system (e.g., of a channel sounding transmitter) provides at least two baseband signals to at least two RF front ends of the channel sounding transmitter. For instance, the at least two baseband signals may comprise digital baseband signals intended for conversion to at least two RF channel sounding waveforms to be transmitted via phased array antennas of the channel sounding transmitter. In other words, the baseband signals may comprise digital representations of the RF channel sounding waveforms.

At step 415, the first processing system steers respective transmit beams via instructions to at least two radio frequency front ends. For example, the channel sounding transmitter may include the at least two RF front ends coupled to at least two phased array antennas to generate at least two radio frequency channel sounding waveforms from the at least two baseband signals. In addition, the channel sounding transmitter may include the at least two phased array antennas, each of which is controllable to provide a respective transmit beam that is steerable in azimuth and elevation, and that comprises one of the at least two RF channel sounding waveforms. In one example, the at least two RF channel sounding waveforms that are transmitted via the respective transmit beams are orthogonal signals that are transmitted at a same time.

In one example, faces of the at least two phased array antennas are arranged to provide a transmit beam coverage over 360 degrees in azimuth. For example, the at least two phased array antennas may comprise a pair of half-cylindrical antennas, where each of the half-cylindrical antennas provides the receive beam coverage over at least a 180 degree azimuthal sector. In another example, the at least two phased array antennas may comprise at least three phased array antennas, where each of the at least three phased array antennas provides a transmit beam coverage over at least a 120 degree azimuthal sector. In still another example, the at least three phased array antennas may comprise at least four phased array antennas, where each of the at least four phased array antennas provides a transmit beam coverage over at least a 90 degree azimuthal sector, and so on.

In one example, each of the at least two RF front ends includes a baseband-to-RF upconverter, which may receive a baseband signal representing a channel sounding waveform, and which may convert the baseband signal to a respective one of the RF channel sounding waveforms. In one example, each of the at least two RF front ends includes a plurality of variable phase shifters associated with respective antenna elements of an associated one of the at least two phased array antennas. Accordingly, the instructions to the at least two RF front ends to steer the respective transmit beams may be for controlling the plurality of variable phase shifters to control the directions of the respective transmit beams. In one example, each of the at least two RF front ends may further include a plurality of variable gain amplifiers (VGAs) to further steer the respective transmit beams and/or to control the beamwidths of the respective transmit beams. In one example, each of the transmit beams may comprise a directional beam with a half-power beamwidth of less than 30 degrees. In one example, the steering of the respective transmit beams at step 415 further comprises controlling the half-power beamwidth of the each of the transmit beams via the instructions (e.g., for controlling the phase shifters and/or VGAs).

At step 420, the first processing system may record spatial orientation information of the respective transmit beams (e.g., along with any characterization parameters of the respective RF channel sounding waveforms and/or the digital representations thereof). In one example, the first processing system may further record timing information of the respective transmit beams (e.g., of the transmission of the respective RF channel sounding waveforms via the transmit beams). To illustrate, the channel sounding transmitter may comprise a gyroscope and a compass. As such, the first processing system may determine the spatial orientation information of the respective transmit beams via the gyroscope and the compass. In one example, the first processing system may also translate beam directions from a local coordinate system to a global coordinate system. In one example, the first processing system may also record location information of the channel sounding transmitter associated with the transmission of respective RF channel sounding waveforms via the transmit beam(s). For instance, the location information may be determined via OTDA techniques with respect to a plurality of cellular base stations or the like, or may be determined via a GPS of the channel sounding transmitter.

At step 425, a second processing system (e.g., of a channel sounding receiver) may steer a respective receive beam via instructions to at least one RF front end of the wireless channel sounding receiver. For example, the wireless channel sounding receiver may comprise at least one phased array antenna controllable to provide the respective receive beam that is steerable in azimuth and elevation. The wireless channel sounding receiver may also comprise least one RF front end coupled to the at least one phased antenna array to receive at least one RF channel sounding waveform from the wireless channel sounding transmitter via the respective receive beam and generate at least one baseband signal from the at least one RF channel sounding waveform. It should be noted that the channel sounding receiver may include any number of phased array antennas, RF front ends, baseband processing units, and so forth, as described above (e.g., two half-cylindrical phased array antennas, three planar phased array antennas, four planar phased array antennas, etc., along with corresponding RF front end(s) and baseband processing unit(s)).

At step 430, the second processing system may receive the at least one baseband signal from the at least one RF front end. For instance, the at least one RF front end may include an RF-to-baseband downconverter. In one example, the baseband signal may comprise a digital baseband signal. For instance, the RF front end may further comprise an analog-to-digital converter (ADC) to sample the analog baseband signals to provide digital baseband signals.

At step 435, the second processing system records the at least one baseband signal. For instance, the channel sounding receiver may include a memory or storage unit to store the at least one baseband signal.

At step 440, the second processing system may record location information of the channel sounding receiver, spatial orientation information of the respective receive beam, and timing information for a receiving of the at least one baseband signal. To illustrate, the channel sounding receiver may comprise a gyroscope and a compass. As such, the second processing system may determine the spatial orientation information of the respective receive beam(s) via the gyroscope and the compass. In one example, the second processing system may also translate beam directions from a local coordinate system to a global coordinate system. In one example, the location information may be determined via OTDA techniques with respect to a plurality of cellular base stations or the like, or may be determined via a GPS of the channel sounding receiver. In one example, step 440 may be performed at the same time as and/or in conjunction with step 435.

At step 445, the second processing system may transmit the at least one baseband signal, the location information of the channel sounding receiver, the spatial orientation information of the respective receive beam, and the timing information to the first processing system. In one example, the transmitting is at a time that is at least after the coherence time of the channel with respect to receiving the at least one baseband signal. In other words the channel sounding receiver records a sequence of one or more baseband signals from one or more received RF channel sounding waveforms via one or more receive beams within the coherence time of the channel. Then the plurality of baseband signals is sent at some later time to the first processing system of the channel sounding transmitter.

At step 450, the second processing system may determine a plurality of measurements of at least one wireless channel parameter based upon the at least one baseband signal. For instance, in one example, step 450 may be performed after the at least one baseband signal is recorded at step 435 and after the coherence time of the channel with respect to receiving the at least one baseband signal from the RF front end. In other words, the channel sounding receiver records a sequence of one or more baseband signals from one or more received RF channel sounding waveforms via one or more receive beams within the coherence time of the channel. Then the plurality of measurements is calculated at some later time. In one example, the at least one wireless channel parameter may comprise a complex impulse response, a path loss, a received signal strength (RSS), e.g., a reference signal received power (RSRP), a carrier-to-interference (CIR) ratio (or signal-to-noise ratio (SNR)), an excess delay, a root-mean-square (RMS) delay spread, an angular spread, a Doppler spread, a fade rate, an angle of arrival (AoA), and the like.

At step 455, the second processing system may record the plurality of measurements of at least one wireless channel parameter. For instance, the channel sounding receiver may be reoriented, may be moved to a different location, and so forth. Additional recordings of baseband signals derived from RF channel sounding waveforms received via one or more receive beams may also be obtained, additional measurements of at least one wireless channel parameter may be determined and stored, and so forth. The plurality of measurements of at least one wireless channel parameter may be stored/recorded along with associated spatial orientation information, such as azimuth and elevation angles, and locations associated with the measurements.

At step 460, the second processing system may transmit the plurality of measurements of the at least one wireless channel parameter to the first processing system (e.g., to the channel sounding transmitter). For instance, the first processing system may correlate the plurality of measurements of the at least one wireless channel parameter with stored information comprising: spatial orientation information of the respective transmit beams (e.g., along with any characterization parameters of the respective RF channel sounding waveforms and/or the digital representations thereof), timing information of the respective transmit beams (e.g., of the transmission of the respective RF channel sounding waveforms via the transmit beams), and so forth to provide a more comprehensive snapshot of the wireless channel(s) being measured.

At step 465, the first processing system may determine a plurality of measurements of at least one wireless channel parameter based upon the at least one baseband signal, the location information of the channel sounding receiver, the spatial orientation information of the respective receive beam, and the timing information (e.g., transmitted to the first processing system by the second processing system at step 445). In one example, the plurality of measurements of at least one wireless channel parameter is further based upon information stored by the first processing system, such as: spatial orientation information of the respective transmit beams (e.g., along with any characterization parameters of the respective RF channel sounding waveforms and/or the digital representations thereof), timing information of the respective transmit beams, location information of the channel sounding transmitter, etc. Notably, the first processing system (of the mobile channel sounding transmitter) may aggregate measurements with respect to the channel sounding transmitter and/or the channel sounding receiver at a plurality of different locations and/or orientations for various purposes, such as for combining measurements, for generating coverage maps, for storage and uploading to another device for analysis, and so forth. Following step 465, the method 400 proceeds to step 495 where the method 400 ends.

It should be noted that the method 400 may be expanded to include additional steps, or may be modified to replace steps with different steps, to combine steps, to omit steps, to perform steps in a different order, and so forth. For example, the method 400 is described in connection with a single channel sounding receiver. However, in another example, multiple channel sounding receivers may be used to obtain baseband signals and/or measures of wireless channel parameter simultaneously and/or in a sequence while deployed at different locations in an environment of interest. In another example, one or more steps of the method 400 may be repeated, e.g., for additional locations of either or both of the channel sounding receiver and channel sounding transmitter. In one example, the method 400 may further include the first processing system and second processing system (e.g., the channel sounding transmitter and the channel sounding receiver) establishing and/or communicating over a wireless side link to exchange information regarding channel sounding waveform(s), such as the shape of the waveform, e.g., return-to-zero (RZ), non-return-to-zero (NRZ), a frequency or range of frequencies, the duration of the waveform, the time and/or frequency resources to be used, and other properties as described above, to establish a time synchronization between the channel sounding transmitter and the channel sounding receiver, and so forth. In still another example, the method 400 may further include either or both of the first processing system and the second processing system transmitting measure(s) of wireless channel parameter(s) and associated data (e.g., location information, timing information, beam orientation information, etc.) to one or more additional devices. Thus, these and other modifications are all contemplated within the scope of the present disclosure.

In addition, although not specifically specified, one or more steps, functions, or operations of the method 400 may include a storing, displaying, and/or outputting step as required for a particular application. In other words, any data, records, fields, and/or intermediate results discussed in the method(s) can be stored, displayed, and/or outputted either on the device executing the method(s) or to another device, as required for a particular application. Furthermore, steps, blocks, functions or operations in FIG. 4 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the example examples of the present disclosure.

FIG. 5 depicts a high-level block diagram of a computing device or processing system specifically programmed to perform the functions described herein. As depicted in FIG. 5, the processing system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for measuring wireless channel parameters using a phased array channel sounding transmitter, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 506 may also include antenna elements, antenna arrays, remote radio heads (RRHs), baseband units (BBUs), transceivers, power units, GPS units, and so forth. Although only one processor element is shown, it should be noted that the computing device may employ a plurality of processor elements. Furthermore, although only one computing device is shown in the figure, if the method 400 as discussed above is implemented in a distributed or parallel manner for a particular illustrative example, i.e., the steps of the above method 400, or the entire method 400, is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 400. In one example, instructions and data for the present module or process 505 for measuring wireless channel parameters using a phased array channel sounding transmitter (e.g., a software program comprising computer-executable instructions) can be loaded into memory 504 and executed by hardware processor element 502 to implement the steps, functions, or operations as discussed above in connection with the illustrative method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for measuring wireless channel parameters using a phased array channel sounding transmitter (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A wireless channel sounding system comprising:
   a wireless channel sounding transmitter comprising:
      at least two radio frequency front ends coupled to at least two phased array antennas to generate at least two radio frequency channel sounding waveforms from at least two baseband signals;
      the at least two phased array antennas, wherein each of the at least two phased array antennas is controllable to provide a respective transmit beam that is steerable in azimuth and elevation, and that comprises one of the at least two radio frequency channel sounding waveforms, wherein faces of the at least two phased array antennas are arranged to provide a transmit beam coverage over 360 degrees in azimuth; and
      a first processing system including at least one processor, in communication with the at least two radio frequency front ends to:
         provide the at least two baseband signals; and
         steer the respective transmit beams via instructions to the at least two radio frequency front ends.

2. The wireless channel sounding system of claim 1, further comprising:
   a wireless channel sounding receiver comprising:
      at least one phased array antenna controllable to provide a respective receive beam that is steerable in azimuth and elevation;
      at least one radio frequency front end coupled to the at least one phased array antenna to:
         receive at least one radio frequency channel sounding waveform of the at least two radio frequency channel sounding waveforms from the wireless channel sounding transmitter via the respective receive beam; and
         generate at least one baseband signal from the at least one radio frequency channel sounding waveform; and a second processing system including at least one processor in communication with the at least one radio frequency front end to:
steer the respective receive beam via instructions to the at least one radio frequency front end;
receive the at least one baseband signal from the at least one radio frequency front end; and
record the at least one baseband signal.

3. The wireless channel sounding system of claim 2, wherein the second processing system is further to:
record location information of the wireless channel sounding receiver, spatial orientation information of the respective receive beam, and timing information for the receiving of the at least one baseband signal.

4. The wireless channel sounding system of claim 3, wherein the second processing system is further to:
transmit the at least one baseband signal, the location information of the wireless channel sounding receiver, the spatial orientation information of the respective receive beam, and the timing information to the first processing system.

5. The wireless channel sounding system of claim 4, wherein the first processing system is further to:
determine a plurality of measurements of at least one wireless channel parameter based upon the at least one baseband signal, the location information of the wireless channel sounding receiver, the spatial orientation information of the respective receive beam, and the timing information.

6. The wireless channel sounding system of claim 5, wherein the first processing system is further to:
record spatial orientation information of the respective transmit beams, wherein the plurality of measurements of the at least one wireless channel parameter is further based upon the spatial orientation information of the respective transmit beams.

7. The wireless channel sounding system of claim 6, wherein the wireless channel sounding transmitter further comprises:
a gyroscope; and
a compass, wherein the first processing system is further to determine the spatial orientation information of the respective transmit beams via the gyroscope and the compass.

8. The wireless channel sounding system of claim 2, wherein the second processing system is further to:
determine a plurality of measurements of at least one wireless channel parameter based upon the at least one baseband signal.

9. The wireless channel sounding system of claim 8, wherein the second processing system is further to:
record the plurality of measurements of the at least one wireless channel parameter.

10. The wireless channel sounding system of claim 8, wherein the second processing system is further to:
transmit the plurality of measurements of the at least one wireless channel parameter to the first processing system.

11. The wireless channel sounding system of claim 1, wherein the at least two radio frequency channel sounding waveforms that are transmitted via the respective transmit beams are orthogonal signals that are transmitted at a same time.

12. The wireless channel sounding system of claim 1, wherein the at least two phased array antennas comprise a pair of half-cylindrical antennas, wherein each of the half-cylindrical antennas provides the transmit beam coverage over at least a 180 degree azimuthal sector.

13. The wireless channel sounding system of claim 1, wherein the at least two phased array antennas comprise at least three phased array antennas, wherein each of the at least three phased array antennas provides a transmit beam coverage over at least a 120 degree azimuthal sector.

14. The wireless channel sounding system of claim 13, wherein the at least three phased array antennas comprise at least four phased array antennas, wherein each of the at least four phased array antennas provides the transmit beam coverage over at least a 90 degree azimuthal sector.

15. The wireless channel sounding system of claim 1, wherein each of the at least two radio frequency front ends includes a plurality of variable phase shifters associated with respective antenna elements of an associated one of the at least two phased array antennas.

16. The wireless channel sounding system of claim 15, wherein the instructions to the at least two radio frequency front ends to steer the respective transmit beams are for controlling the plurality of variable phase shifters to control directions of the respective transmit beams.

17. The wireless channel sounding system of claim 1, wherein each of the respective transmit beams comprises a directional beam with a half-power beamwidth of less than 30 degrees, wherein the steering the transmit beams further comprises controlling the half-power beamwidth of the each of the transmit beams via the instructions.

18. The wireless channel sounding system of claim 1, wherein each of the at least two radio frequency front ends includes a baseband-to-radio frequency upconverter.

19. A method comprising:
providing, by a first processing system of a wireless channel sounding transmitter of a channel sounding system including at least one processor, at least two baseband signals to at least two radio frequency front ends of the wireless channel sounding transmitter; and
steering, by the first processing system, respective transmit beams via instructions to the at least two radio frequency front ends, wherein the at least two radio frequency front ends are to generate at least two radio frequency channel sounding waveforms from the at least two baseband signals, wherein the at least two radio frequency front ends are coupled to at least two phased array antennas of the wireless channel sounding transmitter, wherein each of the at least two phased array antennas is controllable to provide a respective transmit beam that is steerable in azimuth and elevation, and that comprises one of the at least two radio frequency channel sounding waveforms, and wherein faces of the at least two phased array antennas are arranged to provide a transmit beam coverage over 360 degrees in azimuth.

20. A non-transitory computer-readable medium storing instructions which, when executed by at least a first processing system of a wireless channel sounding transmitter of a channel sounding system including at least one processor, cause the at least the first processing system to perform operations, the operations comprising:
providing at least two baseband signals to at least two radio frequency front ends of the wireless channel sounding transmitter; and
steering respective transmit beams via instructions to the at least two radio frequency front ends, wherein the at least two radio frequency front ends are to generate at least two radio frequency channel sounding waveforms from the at least two baseband signals, wherein the at least two radio frequency front ends are coupled to at least two phased array antennas of the wireless channel sounding transmitter, wherein each of the at least two phased array antennas is controllable to provide a respective transmit beam that is steerable in azimuth and elevation, and that comprises one of the at least two radio frequency channel sounding waveforms, and wherein faces of the at least two phased array antennas are arranged to provide a transmit beam coverage over 360 degrees in azimuth.

* * * * *